(12) United States Patent
Kato et al.

(10) Patent No.: US 7,393,143 B2
(45) Date of Patent: Jul. 1, 2008

(54) OPTICAL CONNECTOR AND CONNECTION STRUCTURE OF OPTICAL FIBERS

(75) Inventors: Yoshihisa Kato, Hitachi (JP); Kanako Suzuki, Hitachi (JP); Noribumi Shiina, Hitachi (JP); Tomoyuki Nisio, Hitachi (JP); Kazumasa Ohsono, Hitachi (JP); Yoshikazu Namekawa, Hitachi (JP); Yoshihiro Nakatani, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/637,743

(22) Filed: Dec. 13, 2006

(65) Prior Publication Data
US 2007/0196055 A1    Aug. 23, 2007

(30) Foreign Application Priority Data
Feb. 21, 2006   (JP)   ............................. 2006-044340
Feb. 22, 2006   (JP)   ............................. 2006-044724

(51) Int. Cl.
*G02B 6/38* (2006.01)
(52) U.S. Cl. ............................. 385/73; 385/31; 385/33; 385/50; 385/52; 385/55; 385/60; 385/98
(58) Field of Classification Search ........................ None
See application file for complete search history.

(56) References Cited

U.S. PATENT DOCUMENTS 5,631,985 A   5/1997  Yamada et al.
5,870,514 A * 2/1999  Myslinski et al. ............. 385/56
2003/0185520 A1* 10/2003 Bookbinder et al. .......... 385/73
2006/0204195 A1* 9/2006  Kurosawa et al. ........... 385/125

FOREIGN PATENT DOCUMENTS

| JP | 55-153912 A | 12/1980 |
| JP | 8-114724 A | 5/1996 |
| JP | 2676705 B2 | 7/1997 |
| JP | 11-72641 A | 3/1999 |
| JP | 11-101919 A | 4/1999 |
| JP | 2001-324641 A | 11/2001 |

OTHER PUBLICATIONS

Loctite, Adhesives for Fiber Optic Assembly, 2001, http://www.loctite.us/int_henkel/loctite_us/binarydata/pdf/lt3657_ AdhFiber Optic.pdf, Loctite, p. 3.*

* cited by examiner

*Primary Examiner*—Sung Pak
*Assistant Examiner*—Chad H Smith
(74) *Attorney, Agent, or Firm*—Foley & Lardner LLP

(57) ABSTRACT

An optical connector having: a ferrule into which a first optical fiber is inserted; an optical fiber connector disposed at an back end of the ferrule; and a cross-linkable refractive index matching member attached onto an end face on a back end side of the first optical fiber. The end face on the back end side of the first optical fiber and an end face of a second optical fiber to be inserted into the optical fiber connector from a back end side thereof are to be connected by a butting connection. The cross-linkable refractive index matching member is formed such that a cross-linkable refractive index matching agent is coated on the end face on the back end side of the first optical fiber, and the coated agent is cross-linked and hardened.

28 Claims, 9 Drawing Sheets

OPTICAL CONNECTOR AND CONNECTION STRUCTURE OF OPTICAL FIBERS

The present application is based on Japanese patent applications Nos. 2006-44340 and 2006-44724, the entire contents of which are incorporated herein by reference.

BACKGROUND OF THE INVENTION

1. Field of the Invention

This invention relates to an optical connector and, in particular, to an optical connector that is capable of easy connecting optical fibers in a setting site thereof. Also, this invention relates to a connection structure of optical fibers.

2. Description of the Related Art

At present, in order to connect optical fibers, a physical connecting method is widely used that is conducted by butting against each other end faces of the optical fibers or end faces of the ferrules which houses the optical fiber therein. The physical connecting method includes a connecting method using a mechanical splice and a connecting method using an optical connector. Generally, in case of permanent connection (i.e., the optical fibers are usually not detached after they are connected), the connecting method using the mechanical splice is suitably used. Different from the permanent connection, in case of frequently detaching the optical fibers, the connecting method using the optical connector is suitably used. Practically, the mechanical splice is used for the permanent connection and the optical connector is used for the case that the optical fibers are frequently detached.

The connecting method using the mechanical splice and the connecting method using the optical connector are both conducted by applying a pressing force along the axis direction of the optical fibers mutually to the end face of the optical fibers. Thus, particularly in the connecting method using the optical connector that the frequent detaching can be simulated, it is necessary to prevent the damage of the end face of the optical fibers. Therefore, the optical fibers are physically contacted each other at the end face thereof while being protected by a ferrule into which they are inserted (See JP-A-1996-114724 (hereinafter called patent document 1)).

In the physical connecting method (such as the connecting method using the mechanical splice and the connecting method using the optical connector), a profile of the end face of optical fiber can seriously affect its connection characteristics. For example, when angle of the end face of the optical fiber is not aligned or the profile of the end face of the optical fiber is rough, air may enter in a space between the end face of the optical fibers to butt and contact each other. As a result, Fresnel reflection increases at the end face of the optical fiber to cause an increase in connection loss of the optical fiber. A method for preventing the increase in connection loss of the optical fiber is known that the end face of the optical fiber or the ferrule is polished after cutting the optical fiber.

Another method is known that the optical fibers are connected each other without polishing the end face of the optical fiber or the ferrule after cutting the optical fiber. This method is conducted such that a refractive index matching agent in liquid or grease state is interposed between the end faces of the optical fibers, where the agent has a refractive index similar to that of a core of the optical fiber (See JP-A-1999-72641 (hereinafter called patent document 2) and JP-A-1999-101919 (hereinafter called patent document 3)). In this method, the refractive index matching agent is coated on the end face of the optical fibers, or filled into a connection portion of the optical fibers, and then the optical fibers are butted each other. Thus, air can be prevented from entering into the space between the end faces of the optical fibers, the Fresnel reflection caused by the air can be lowered, and the connection loss of the optical fiber can be reduced.

Another method is known that uses a refractive index matching film (hereinafter simply called film) (See JP-B-2676705 (hereinafter called patent document 4), JP-A-2001-324641 (hereinafter called patent document 5) and JP-A-1980-153912 (hereinafter called patent document 6)).

However, of the conventional methods, the method of polishing the end face of the optical fibers or the ferrule is not suitable for connecting the optical fibers, especially an optical fiber (hereinafter called holey fiber) having plural periodical hole portions therein. When the optical fibers are connected in a setting site, a lot of time consumption and labor charge are required for polishing the end face of the optical fibers etc., and a polishing device must be prepared for polishing the end face of the optical fibers etc. Further, when the end face of the holey fiber is polished, a polishing residue generated in the polishing process and an abrasive agent used in the polishing process may enter the hole portion of the holey fiber to cause an increase in connection loss and a reduction in reliability.

On the other hand, the method of interposing the refractive index matching agent between the connection ends of the optical fibers as disclosed in the patent documents 2, 3 has the following problem. Since the refractive index matching agent generally is formed of a silicone or paraffin agent in liquid or grease state, it can enter into the hole portions of the holey fiber when the optical fibers are connected each other by using the optical connecter having the refractive index matching agent therein. Further, this method has the problem that, since the refractive index matching agent generally has a temperature dependency in refractive index, transmission loss of the holey fiber is extremely changed according to a change in refractive index of the refractive index matching agent entered into the hole portion of the holey fiber. Furthermore, this method has the problem that, when the refractive index matching agent enters into the hole portion of the holey fiber, the refractive index matching agent between the end faces of the optical fibers decreases so that air gaps and air bubbles are easily generated between the end faces of the optical fibers to cause the significant lowering of optical characteristics of the holey fiber.

A method may be simulated that the hole portions at the end face of the holey fiber are sealed before connecting the holey fiber. However, such a method is not suitable for connecting the optical fibers at the setting site since a dedicated connecting device is needed for performing the method and a lot of time consumption is required for sealing the hole portions at the end face of the holey fiber to cause an increase in connection cost of the optical fibers.

Furthermore, the methods of using the film as disclosed in the patent documents 4 to 6 have the following problem. Since the diameter of the optical fiber is as fine as 80 or 125 μm, it is very hard to attach the film onto the end face of the optical fibers at high dimensional accuracy. Further, the film needs to have an adhesive ability or stickiness in order to attach the film onto the end face of the optical fibers. Therefore, when the optical fibers are connected each other at the setting site, a foreign substance such as a dust can easily adhere to the film to reduce reliability of the optical fiber and workability during the connection process of the optical fibers.

SUMMARY OF THE INVENTION

It is an object of the invention to provide an optical connector that can easy connect optical fibers at the setting site.

It is a further object of the invention to provide a connection structure of optical fibers that connection loss of the optical fiber can be deceased and connection reliability can be enhanced.

(1) According to one aspect of the invention, an optical connector comprises:

a ferrule into which a first optical fiber is inserted;

an optical fiber connector disposed at an back end of the ferrule; and a cross-linkable refractive index matching member attached onto an end face on a back end side of the first optical fiber, wherein the end face on the back end side of the first optical fiber and an end face of a second optical fiber to be inserted into the optical fiber connector from a back end side thereof are to be connected by a butting connection, and the cross-linkable refractive index matching member is formed such that a cross-linkable refractive index matching agent is coated on the end face on the back end side of the first optical fiber, and the coated agent is cross-linked and hardened.

(2) According to another aspect of the invention, a connection structure of optical fibers comprises:

a first optical fiber;

a ferrule into which the first optical fiber is inserted;

an optical fiber connector disposed at a back end of the ferrule;

a second optical fiber inserted into the optical fiber connector from a back end side thereof; and a cross-linkable refractive index matching member attached onto an end face on a back end side of the first optical fiber, wherein the end face on the back end side of the first optical fiber and an end face of a second optical fiber are connected by a butting connection, and the cross-linkable refractive index matching member is formed such that a cross-linkable refractive index matching agent is coated on the end face on the back end side of the first optical fiber, and the coated agent is cross-linked and hardened.

In the above inventions (1) and (2), the following modifications and changes can be made.

(i) The end face on the back end side of the first optical fiber is formed spherical.

(ii) The cross-linkable refractive index matching member comprises a refractive index within 1.46±0.05.

(iii) The cross-linkable refractive index matching member comprises a rate of change in refractive index within ±2% at a temperature of −40 to 70° C.

(iv) The cross-linkable refractive index matching member comprises an optical transmittance of 80% or more.

(v) The cross-linkable refractive index matching member comprises a breaking elongation of 50% or more.

(vi) The cross-linkable refractive index matching member comprises a glass adhesive force of 50 g/10 mm width or more.

(vii) The cross-linkable refractive index matching member comprises a thickness of 5 to 100 μm.

(viii) A face of the cross-linkable refractive index matching member in contact with (or to contact) the end face of the second optical fiber inserted (or to be inserted) into the optical fiber connector from the back end side thereof is formed spherical.

(ix) The cross-linkable refractive index matching member is attached to only the end face of the first optical fiber.

(x) The cross-linkable refractive index matching member is attached ranging from the end face to a side face of the first optical fiber.

(xi) The spherical form of the end face on the back end side of the first optical fiber comprises a curvature radius of 0.1 to 30 mm.

(xii) The optical fiber connector comprises a plate comprising a groove with a cross-sectional area greater than the second optical fiber to be inserted from the back end side thereof.

(xiii) The groove comprises a V-shaped groove.

(xiv) The second optical fiber comprises a holey fiber.

<Advantages of the Invention>

According to the invention, an optical connector that can easily connect optical fibers (in particular, holey fibers) in a setting site thereof, after the optical fibers are cut, in an original state of the cutting without a requirement of polishing the end faces of the optical fibers, can be provided.

Further, an optical connector that less subjects to a change with time (due to a temperature dependency), can be easily attached and removed repeatedly, and comprises a high stability of an optical transmission characteristic and a good connection characteristic, can be provided.

Further, the optical connector according to the invention comprises a structure that a face shape of the cross-linkable refractive index matching member contacting the end face of the second optical fiber to be inserted to the optical fiber connector from the side of the back end thereof is formed to a spherical shape, so that the optical connector can achieve the following advantages (1) and (2). That is, the end faces of the optical fibers can be brought closer to each other in comparison with a case that a face of the cross-linkable refractive index matching member is plane, since when the second optical fiber is pressed in the optical fiber connector it is easily changed form (advantage (1)). If the face of the cross-linkable refractive index matching member is plane, when the second optical fiber is pressed in the optical fiber connector an air layer may remain between the end face (in particular, a center portion of the optical fiber) of the second optical fiber and the cross-linkable refractive index matching member. The phenomenon may occur even if the end face of the second optical fiber is cut at a right angle, but in particular, if the end face is cut at a slant, the second optical fiber is pushed back by an elastic force of the cross-linkable refractive index matching member when it is pushed in, so that a core of the second optical fiber may not contact the cross-linkable refractive index matching member. On the other hand, if the face shape of the cross-linkable refractive index matching member is formed to a spherical shape, the end face of the second optical fiber contacts the cross-linkable refractive index matching member from a center portion thereof, so that the air layer does not remain between the end face (in particular, a center portion of the optical fiber) of the second optical fiber and the cross-linkable refractive index matching member (advantage (2)).

Further, the optical connector according to the invention comprises a structure that the cross-linkable refractive index matching member is attached to only the end face of the first optical fiber, so that the optical connector can achieve the following advantages (3) to (5). That is, if the cross-linkable refractive index matching member is also attached to the side face of the first optical fiber, when the back end portion of the first optical fiber attached with the cross-linkable refractive index matching member is set in the groove (V-shaped groove) the first optical fiber is likely to cause an axis misalignment to the second optical fiber. On the other hand, if the cross-linkable refractive index matching member is attached to only the end face of the first optical fiber, the axis misalignment between the first optical fiber and the second optical fiber can be prevented (advantage (3)). Further, if the cross-linkable refractive index matching member is also attached to the side face of the first optical fiber, when the back end portion of the first optical fiber attached with the cross-linkable refractive index matching member is to be set in the groove (the V-shaped groove), the cross-linkable refractive index matching member is attached to the groove (V-shaped groove) portion in which the second optical fiber 12 is to be set later, so as to exert a harmful influence to the setting of the second optical fiber. On the other hand, if the cross-linkable refractive index matching member is attached to only the end face of the first optical fiber, the harmful influence to the setting of the second optical fiber can be prevented (advantage (4)). Further, if the cross-linkable refractive index matching member is also attached to the side face of the first optical fiber, when the back end portion of the first optical fiber attached with the cross-linkable refractive index matching member is pressed from a top of the groove (V-shaped groove) the cross-linkable refractive index matching member in a side of the side face of the first optical fiber is split, so that when the first optical fiber is attached and removed repeatedly the split may grow up so as to reach the cross-linkable refractive index matching member. On the other hand, if the cross-linkable refractive index matching member is attached to only the end face of the first optical fiber, the disadvantage described above can be prevented (advantage (5)). Further, methods for attaching the cross-linkable refractive index matching member to only the end face of the first optical fiber may include a method comprising a step of conducting a water repellent finishing to the side face of the first optical fiber, so that when the cross-linkable refractive index matching member is coated on the end face of the first optical fiber the cross-linkable refractive index matching member can be prevented from entering the side face of the first optical fiber.

Further, the optical connector according to the invention comprises a structure that the cross-linkable refractive index matching member is attached over from the end face to the side face of the first optical fiber, so that the optical connector can achieve the following advantage. That is, if the cross-linkable refractive index matching member is attached to only the end face of the first optical fiber, when the second optical fiber is attached and removed the cross-linkable refractive index matching member may be separated from the end face of the first optical fiber. On the other hand, if the cross-linkable refractive index matching member is attached over from the end face to the side face of the first optical fiber, so that the separation can be prevented.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
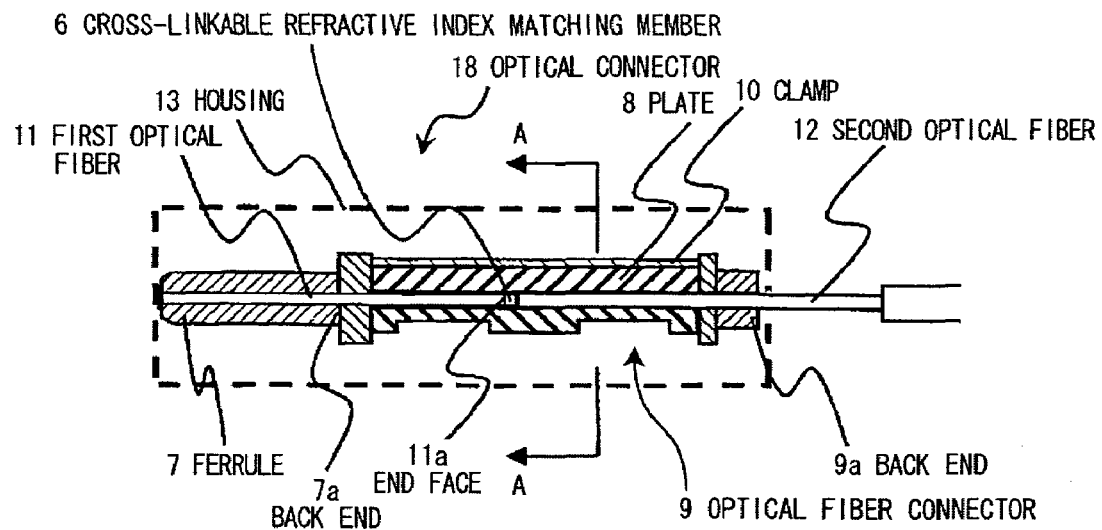
FIG. 1 is a cross sectional view showing an optical connector (after a butting connection of optical fibers) in a preferred embodiment according to the invention.

FIG. 1 is a cross sectional view showing an optical connector (after a butting connection of optical fibers) in a preferred embodiment according to the invention.

As shown in FIG. 1, an optical connector 18 comprises a ferrule 7 to which a first optical fiber 11 is to be housed and an optical fiber connector 9 (comprising a plate 8, a clamp 10 etc.) connected together to an back end 7a of the ferrule 7. Further, in the optical connector 18, the end face 11a in the side of the back end of the first optical fiber 11 and an end face of a second optical fiber 12 to be inserted to the optical fiber connector 9 from a side of the back end 9a thereof are to be connected by a butting connection.

A cross-linkable refractive index matching member 6 is attached to the end face 11a in the side of the back end of the first optical fiber 11, and the cross-linkable refractive index matching member 6 is formed by a step that a cross-linkable refractive index matching agent is coated on the end face 11a in the side of the back end of the first optical fiber 11, and the coated agent is cross-linked and hardened.

As an organic material comprising a refractive index matching property (a refractive index matching agent), materials comprising optical characteristics desired according to need (a refractive index, an optical transmission, etc.), can be appropriately selected from a group of organic materials such as an acrylic, an epoxy, a vinyl-based, an ethylene-based, a silicone-based, a urethane-based, a polyamide-based, a fluorine-based, a polybutadiene-based, a polycarbonate-based material, but the materials are not limited to the specific materials described above.

Further, the cross-linkable refractive index matching agent is defined as an agent reacting to heat and light, humidity, electron beam etc. and changing from a liquid form to a solid form (cross-linking and hardening), of the refractive index matching agents described above. And the cross-linkable refractive index matching agent satisfying the following condition can be used. The condition is that, when the cross-linkable refractive index matching agent being cross-linked and hardened (the cross-linkable refractive index matching member 6) is attached to the optical fibers and is used in a connection portion thereof, the optical transmission in the connection portion can be conduced.

It is preferable that a refractive index of the cross-linkable refractive index matching member 6 is within 1.46±0.05. If the refractive index is out of the range of 1.46±0.05 a connection loss is increased and a turn loss is lowered extremely. Further, it is more preferable that a refractive index of the cross-linkable refractive index matching member 6 is within 1.46±0.01.

It is preferable that a rate of change of the refractive index of the cross-linkable refractive index matching member 6 is within ±2% at −40 to 70° C.

It is preferable that an optical transmission of the cross-linkable refractive index matching member 6 is 80% or more. If the optical transmission is less than 80% the connection loss at the connection portion exceeds 1 dB. Further, it is more preferable that the optical transmission of the cross-linkable refractive index matching member 6 is 90% or more.

It is preferable that a breaking elongation of the cross-linkable refractive index matching member 6 is 50% or more. If the breaking elongation is less than 50% when the member 6 is changed shape by a pressing force at the connection splits and collapses are likely to be generated in the cross-linkable refractive index matching member 6. Further, it is more preferable that the breaking elongation of the cross-linkable refractive index matching member 6 is 100% or more.

Further, "a breaking elongation of the cross-linkable refractive index matching member" means an elongation percentage up to being broken when the following film is pulled at a pull velocity of 50 nm/min. The film is formed by a step of forming a film layer of 100 μm thickness composed of the cross-linkable refractive index matching agent on a silica slide glass plate, hardening the agent so as to form a film composed of the cross-linkable refractive index matching member, and forming the film to a strip of 10 mm width.

It is preferable that a glass adhesive force of the cross-linkable refractive index matching member 6 is 50 g /10 mm width or more. If the glass adhesive force is less than 50 g /10 mm width when the optical fiber is attached and removed repeatedly from and to the optical fiber connector the cross-linkable refractive index matching member 6 is likely to drop out.

Further, it is preferable that the glass adhesive force of a surface of the cross-linkable refractive index matching member 6 attached to the end face of the first optical fiber 11 is smaller than the glass adhesive force of the end face of the first optical fiber 11. If the glass adhesive force of a surface of the cross-linkable refractive index matching member 6 attached to the end face of the first optical fiber 11 is larger than or equal to the glass adhesive force of the end face of the first optical fiber 11, since the second optical fiber 12 is repeatedly attached and removed, when the second optical fiber 12 is removed the cross-linkable refractive index matching member 6 is like to drop out and to be attached to the second optical fiber 12.

Further, "a glass adhesive force of the cross-linkable refractive index matching member" means a value obtained from a loading when the following film is peeled at 90 degrees angle to a silica slide glass plate at a peeling velocity of 50 mm/min according to "90 degrees peeling method" of JIS Z0237. The film is formed by a step of forming a film layer of 100 μm thickness composed of the cross-linkable refractive index matching agent on the silica slide glass plate, hardening the agent so as to form a film composed of the cross-linkable refractive index matching member, and forming the film to a strip of 10 mm width.

It is preferable that a thickness of the cross-linkable refractive index matching member 6 is 5 to 100 μm. If the thickness is less than 5 μm, a volume of the cross-linkable refractive index matching member 6 is insufficient, so that it is difficult to obtain a sufficient refractive index matching property, and the optical fibers is likely to directly contact each other, so that a scratch is likely to be produced on the end faces of the optical fibers. Further, if the thickness is more than 100 μm, a distance between the end faces of the optical fibers is likely to be wider, so that it is likely to affect an influence of an expansion and shrinkage due to an axis misalignment and a temperature change. It is preferable that the thickness of the cross-linkable refractive index matching member 6 is 10 to 60 μm, and it is more preferable that the thickness is 15 to 40 μm.

Further, "a thickness of the cross-linkable refractive index matching member" means that in the cross-linkable refractive index matching member 6 attached to the end face of the first optical fiber 11 in a circular, spherical shape or a trapezoid shape, a thickness in the most thick portion from the end face of the first optical fiber 11.

In the invention it is preferable that the end face 11a in the side of the back end of the first optical fiber 11 is formed to a spherical shape. And it is more preferable that the spherical shape of the end face 11a in the side of the back end of the first optical fiber 11 comprises a curvature radius of 0.1 to 30 mm.

As described above the spherical shape of the end face 11a in the side of the back end of the first optical fiber 11 comprises a curvature radius of 0.1 to 30 mm, so that a core of the first optical fiber 11 can be contacted a core of the second optical fiber 12 connected to the first optical fiber 11 in a condition the optical fibers 11, 12 are close to each other as far as possible, and the lowering of the connection loss can be suppressed. If the end face 11a in the side of the back end of the first optical fiber 11 comprises a curvature radius of less than 0.1 mm, when being connected to the second optical fiber 12 the end face of the second optical fiber 12 is likely to be damaged and the first optical fiber 11 is likely to be chipped. If the spherical shape of the end face 11a in the side of the back end of the first optical fiber 11 comprises a curvature radius of more than 30 mm, a spherical surface effect (an effect obtained by that the core of the first optical fiber 11 can be contacted a core of the second optical fiber 12 in a condition the optical fibers 11, 12 are close to each other as far as possible) may not be obtained, and it is more preferable that the spherical shape of the end face 11a in the side of the back end of the first optical fiber 11 comprises a curvature radius of 1 to 15 mm.

Examples of a method for forming the end face 11a in the side of the back end of the first optical fiber 11 to the described above curvature radius include an electrical spark forming, a polishing method etc.

EXAMPLES OF THE INVENTION

Hereinafter, an optical connector according to the invention will be explained by Examples in further detail.

Example 1

As a cross-linkable refractive index matching agent, an ethyl acetate 50% solution of an acrylic resin 100 weight parts comprising n-butyl acrylate/methyl acrylate/acrylic acid/2-hydroxyethylmethacrylate copolymer (compounding ratio=82/15/2.7/0.3 (weight part)) and a cross-linking agent 1.0 weight part manufactured by Nihon Polyurethane Industry Co., Ltd and marketed under a trade name of "coronate L" were compounded and mixed together.

An optical transmission in a wavelength range of 1300 to 1600 nm of an cross-linkable refractive index matching member obtained by cross-linking and hardening the acrylic adhesive coating solution (the cross-linkable refractive index matching agent) obtained as described above, was measured by a spectral photometer. As a result of the measurement, the optical transmission of 93 to 95% was obtained. And a refractive index thereof is also measured by an Abbe refraction meter, so that a refractive index of 1.465±0.005 or less at a room temperature (23±2° C.) was obtained.

Further, a breaking elongation thereof is also measured, so that the breaking elongation of 200 to 300% was obtained, and a glass adhesive force thereof is also measured, so that the glass adhesive force of 500 to 1000 g/10 mm width was obtained.

The cross-linkable refractive index matching member obtained as described above was used as described below.

Figure 2:
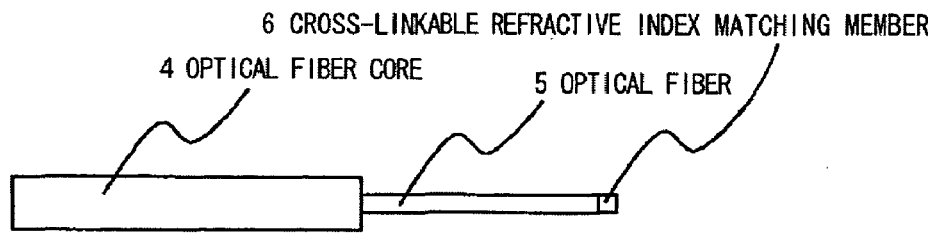
FIG. 2 is a side view showing an example of an optical fiber to be housed in an optical connector in a preferred embodiment according to the invention.
Figure 3A:
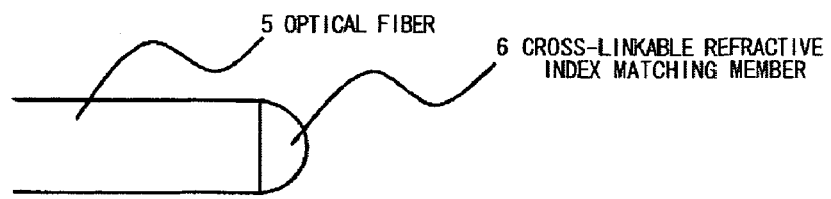
FIG. 3A is a side view showing an example of an optical fiber being attached with a cross-linkable refractive index matching member at the end face thereof, to be housed in an optical connector in a preferred embodiment (Examples 1 and 2) according to the invention (a partially enlarged view showing an end portion of the optical fiber shown in FIG. 2)

As shown in FIG. 2, first a covering layer of an optical fiber core 4 manufactured by Hitachi Cable Ltd. and marketed under a trade name of "BBG-SM-WF" (outer diameter of 250 µm and fiber diameter of 125±1 µm) was removed by 200 mm length, after a surface of the optical fiber 5 composed of a glass material and being exposed by removal of the covering layer was cleansed by an alcohol cleaning, an end portion of the optical fiber 5 was cut by a fiber cutter at a right angle (angular error: 1 degree or less), the cross-linkable refractive index matching agent obtained as described above was attached to the end surface of the optical fiber 5 by a potting and was cross-linked and hardened by a room temperature incubation, so that the cross-linkable refractive index matching member 6 is attached to the end surface of the optical fiber 5 (refer to FIG. 3A). Further, a thickness of the cross-linkable refractive index matching member 6 was formed to 20 to 25 µm.

Figure 4:
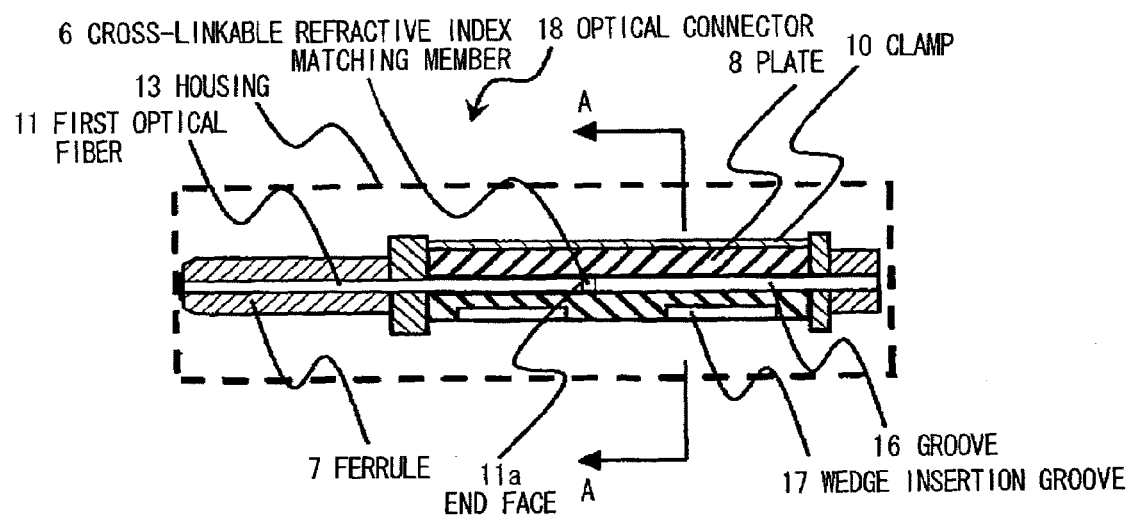
FIG. 4 is a cross sectional view showing an optical connector (before an insertion of a wedge to a wedge insertion groove) in a preferred embodiment according to the invention.

As shown in FIG. 4, the optical fiber 5 to which the cross-linkable refractive index matching member 6 was attached, was cut and then the optical fiber 5 was inserted and fixed to an optical connector 18 comprising a ferrule 7, an optical fiber connector 9 (comprising plates 8, a clamp 10 functioning as a spring for covering the plate 8 and strengthening a connection of each other of the plates 8, a groove 16 formed on the plate 8 for a second optical fiber 12 to be inserted, and a wedge insertion groove 17 for a wedge 15 to be inserted), and a housing 13. Further, the optical fiber 5 was cut at a front end of the ferrule 7, and the front end of the ferrule 7 was polished, so that the first optical fiber 11 was incorporated into the ferrule 7. Ten pieces of the optical connectors 18 made as described above were prepared.

Figure 8:
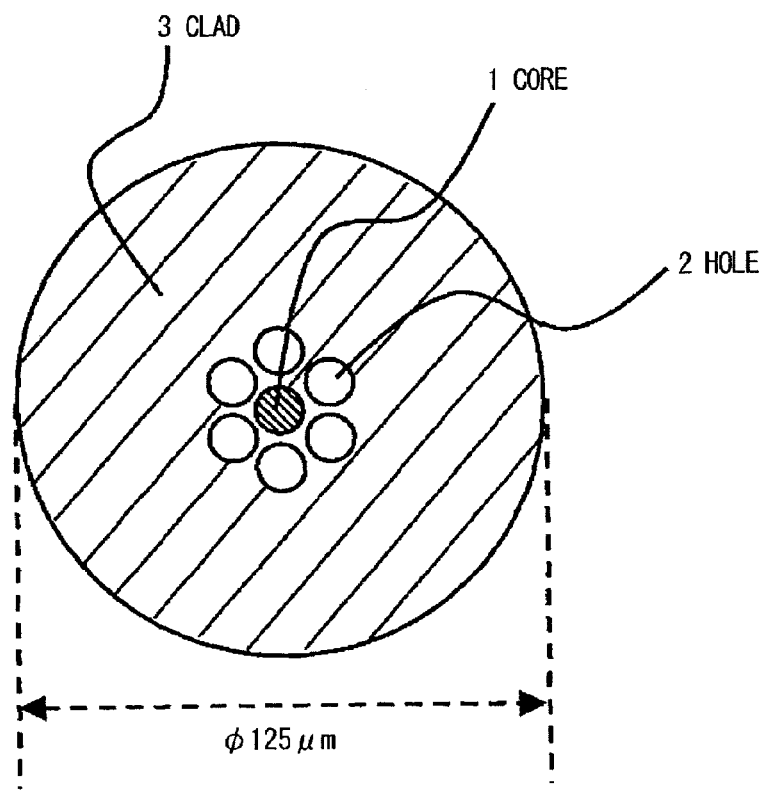
FIG. 8 is a cross sectional view showing an example of a second optical fiber to be inserted to an optical connector in a preferred embodiment according to the invention and an optical connector in Comparative Example.
Figure 9:
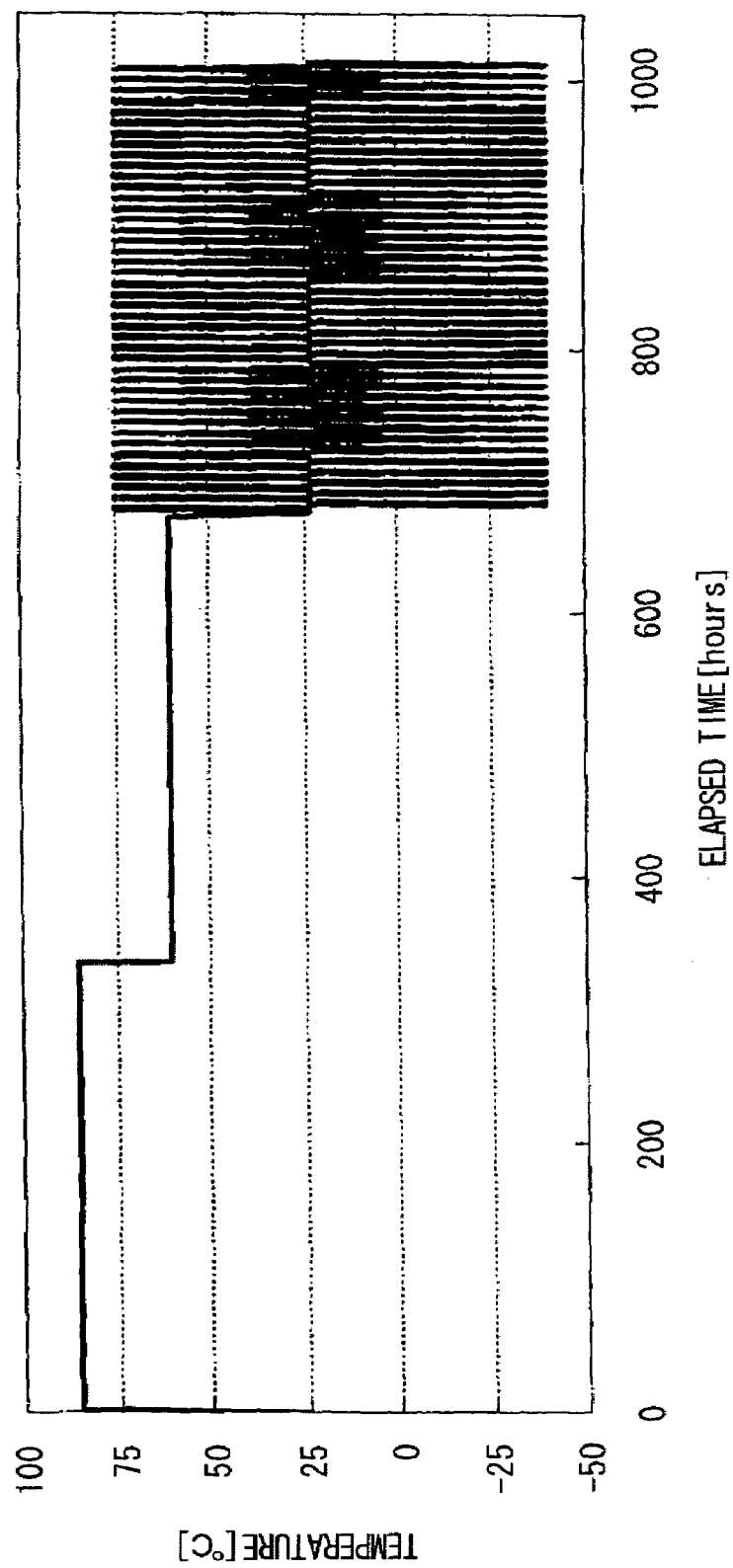
FIG. 9 is a graph showing a temperature condition (a relation between a temperature and an elapsed time) in a test (a continuous temperature and humidity cycle test) conducted by using an optical connector in a preferred embodiment according to the invention and an optical connector in Comparative Example.
Figure 10:
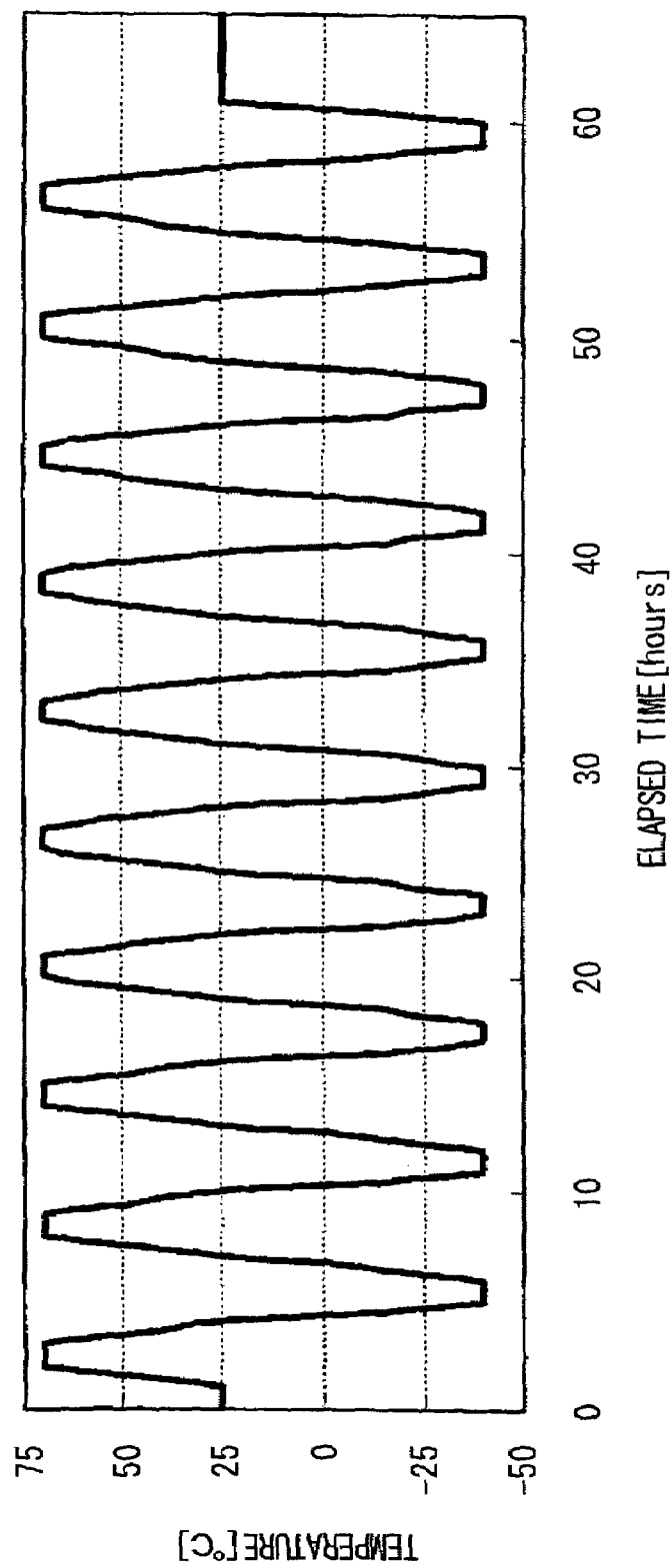
FIG. 10 is a graph showing a temperature condition (a relation between a temperature and an elapsed time) in a test (a temperature cycle test) conducted by using an optical connector in a preferred embodiment according to the invention and an optical connector in Comparative Example.
Figure 11:
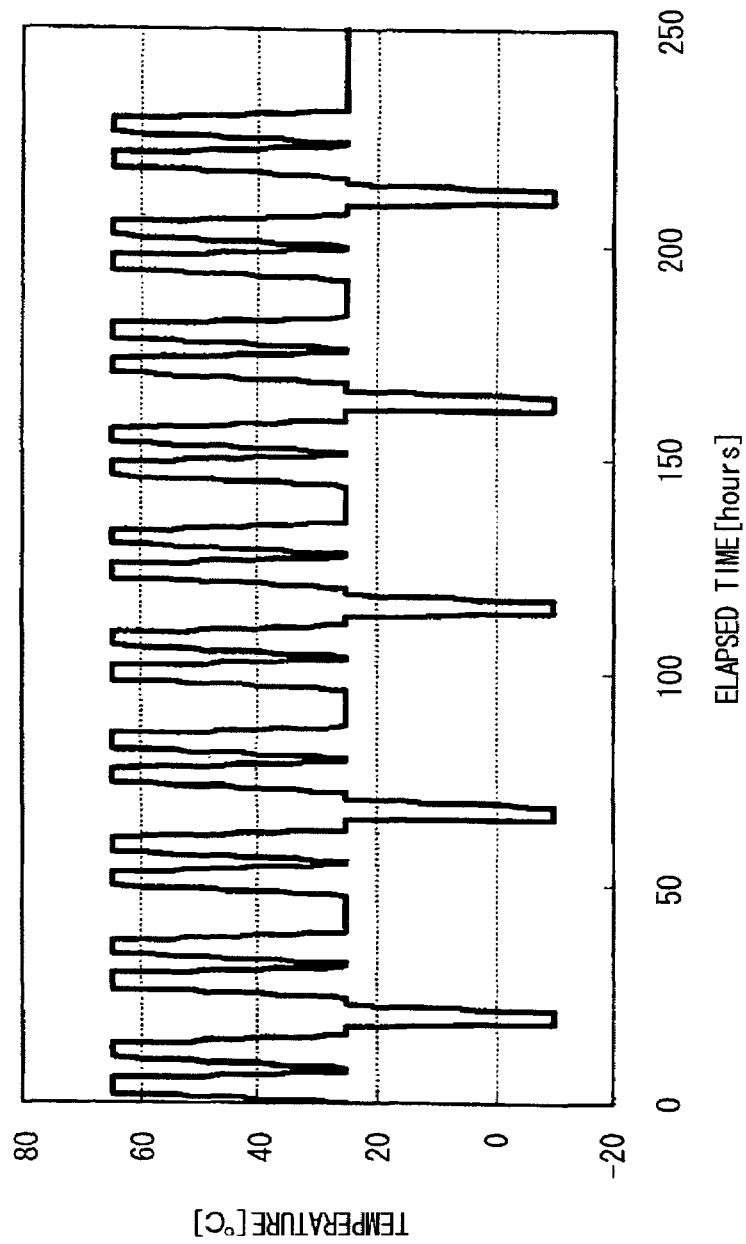
FIG. 11 is a graph showing a temperature condition (a relation between a temperature and an elapsed time) in a test (a temperature and humidity cycle test) conducted by using an optical connector in a preferred embodiment according to the invention and an optical connector in Comparative Example.
Figure 12:
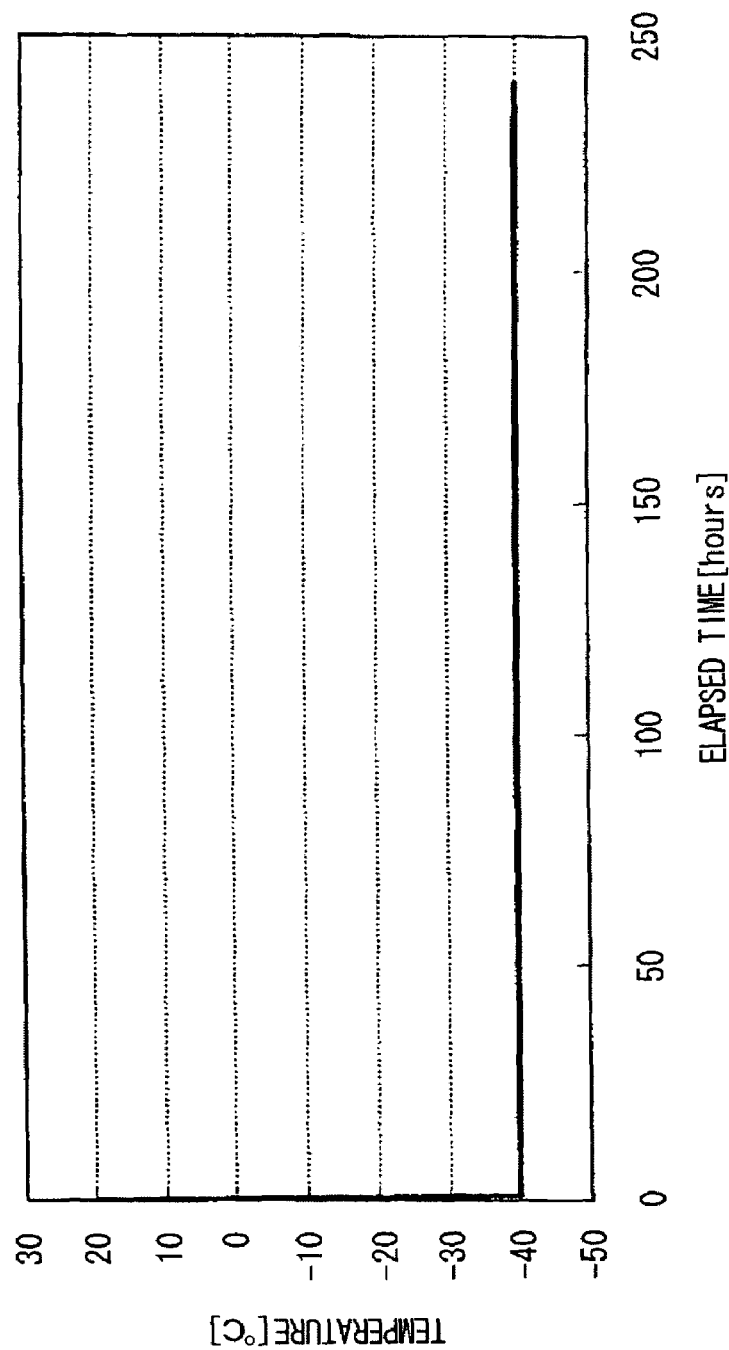
FIG. 12 is a graph showing a temperature condition (a relation between a temperature and an elapsed time) in a test (a low temperature test) conducted by using an optical connector in a preferred embodiment according to the invention and an optical connector in Comparative Example.

Next, a covering layer in one end of a holey fiber manufactured by Hitachi Cable Ltd. and marketed under a trade name of "BBG-HF" (outer diameter of 250 µm and fiber diameter of 125±1 µm) to be used as a second optical fiber 12 at a setting of the optical fiber was removed, and a surface of the second optical fiber 12 composed of a glass material and being exposed by removal of the covering layer was cleansed by an alcohol cleaning, and then an end portion of the second optical fiber 12 was cut by a fiber cutter at a right angle (angular error: 1 degree or less), and the second optical fiber 12 was inserted to a optical connector 18 preliminarily prepared so as to realize a connection by the optical fiber connector 9. Further, FIG. 8 is a cross sectional view showing an example of second optical fiber 12 to be inserted to an optical connector in a preferred embodiment according to the invention.

The following measurements were conducted. That is, a connection loss (dB) and a return loss (dB) just after the second optical fiber 12 was connected, and a connection loss (dB) and an increase of loss by such tests at a connection portion after a room temperature (23±2° C.) incubation during 24 hours as (1) a continuous temperature and humidity cycle test (temperature 85° C.×336 hours→temperature 60° C.×humidity 95%×336 hours →temperature −40 to 75° C./8 hours×42 cycles), (2) a temperature cycle test (temperature −40 to 70° C./6 hours×10 cycles), (3) a temperature and humidity cycle test ((temperature 25° C.×humidity 93%~temperature 65° C.×humidity 93%~temperature 25° C. ×humidity 93% ~temperature 65° C. ×humidity 93%~temperature 25° C. ×humidity 93%~temperature −10 to 25° C.×humidity 93%~temperature 65° C.×humidity 93%~temperature 25° C.×humidity 93%~temperature 65° C.×humidity 93% ~temperature 25° C.×humidity 93%)×5 cycles), −(4) a low temperature test (temperature −40×240 hours) were measured (temperature conditions in each of the tests were shown in FIGS. 9 to 12). In the test (1), five pieces of the optical connectors 18 of ten pieces thereof preliminarily prepared were used. And the tests (2) to (4) were conducted in order by using remaining five pieces of the optical connectors 18. Results of the tests (1) to (4) are shown in Table 1.

Figure 5:
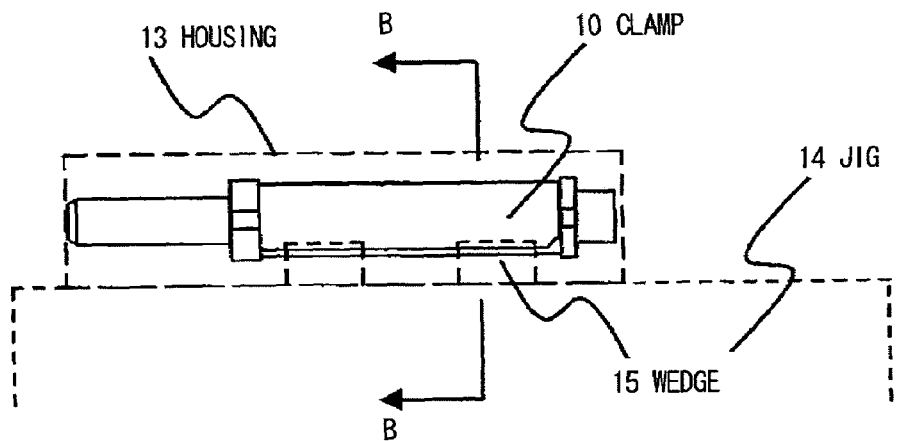
FIG. 5 is a side view showing an optical connector (after an insertion of a wedge to a wedge insertion groove) in a preferred embodiment according to the invention.
Figure 6A:
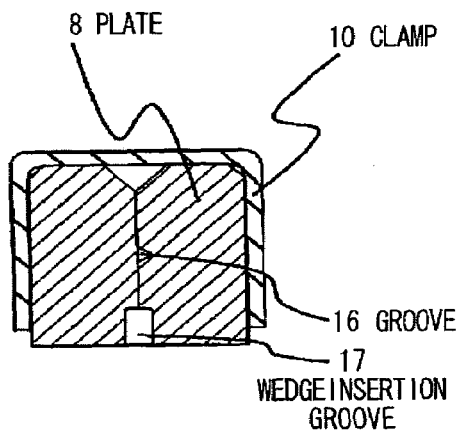
FIG. 6A is a cross sectional view showing an optical connector (before an insertion of a wedge to a wedge insertion groove) in a preferred embodiment according to the invention (a cross sectional view taken along the line A-A in FIG. 4)
Figure 6B:
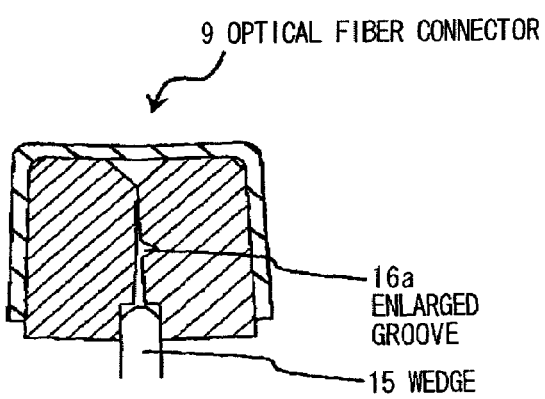
FIG. 6B is a cross sectional view showing an optical connector (after an insertion of a wedge to a wedge insertion groove) in a preferred embodiment according to the invention (a cross sectional view taken along the line B-B in FIG. 5)
Figure 7:
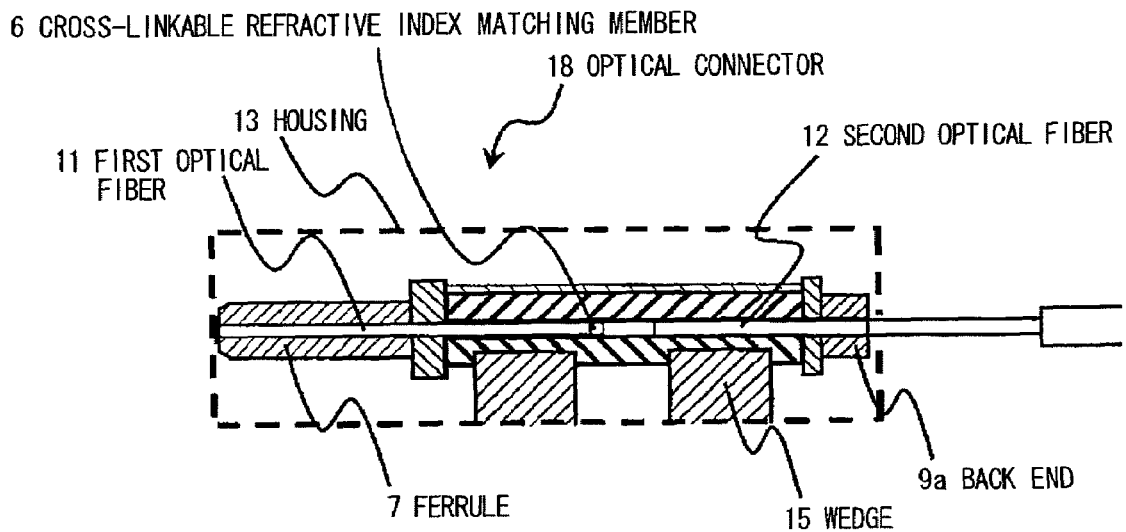
FIG. 7 is a cross sectional view showing an optical connector (after an insertion of a wedge to a wedge insertion groove) in a preferred embodiment according to the invention.

Further, FIGS. 5 to 7 shows a process of inserting the first optical fiber 11 to the optical connector 18 and connecting by the optical fiber connector 9. First, wedges 15 formed in a jig 14 (refer to FIG. 5) are inserted to the wedge insertion grooves 17 formed in the plate 8 constituting the optical fiber connector 9. And the second optical fiber 12 is inserted to an enlarged groove 16a enlarged by the above (refer to FIG. 6B and FIG. 7), so that the first optical fiber 11 and the second optical fiber 12 are connected to each other. Further, the groove 16 is not limited to a specific shape, but in a case of a V-shaped groove (a groove comprising a cross-sectional shape of a V-shape) the most preferable characteristic can be obtained. That is, when an end surface of the second optical fiber 12 and an end face 11a of the first optical fiber 11 are connected by a butting connection, the cross-linkable refractive index matching member 6 not directly contributing to the butting connection escapes to a space in the V-shaped groove, so that a good connection characteristic can be obtained.

Example 2

As a cross-linkable refractive index matching agent, an addition type silicone based adhesive material coating liquid comprising SD4590/BY24-741/SRX212/toluene (compounding ratio=100/1.0/0.9/50 (weight part)) is prepared (all of SD4590, BY24-741 and SRX212 are manufactured by Dow Corning Toray Co., LTd).

An optical transmission in a wavelength range of 1300 to 1600 nm of an cross-linkable refractive index matching member obtained by cross-linking and hardening the addition type silicone based adhesive material coating liquid (the cross-linkable refractive index matching agent) obtained as described above, was measured by a spectral photometer. As a result of the measurement, the optical transmission of 92 to 94% was obtained. And a refractive index thereof is also measured by an Abbe refraction meter, so that a refractive index of 1.465±0.005 or less at a room temperature (23±2° C.) was obtained.

Further, a breaking elongation thereof is also measured, so that the breaking elongation of 200 to 300% was obtained, and a glass adhesive force thereof is also measured, so that the glass adhesive force of 500 to 1000 g/10 mm width was obtained.

The cross-linkable refractive index matching member obtained as described above was used as described below.

As shown in FIG. 2, first a covering layer of an optical fiber core 4 manufactured by Hitachi Cable Ltd. and marketed under a trade name of "BBG-SM-WF" (outer diameter of 250 µm and fiber diameter of 125±1 µm) was removed by 200 mm length, after a surface of the optical fiber 5 composed of a glass material and being exposed by removal of the covering layer was cleansed by an alcohol cleaning, an end portion of the optical fiber 5 was cut by a fiber cutter at a right angle (angular error: 1 degree or less), the cross-linkable refractive index matching agent obtained as described above was attached to the end surface of the optical fiber 5 by a potting and was cross-linked and hardened by a room temperature incubation, so that the cross-linkable refractive index matching member 6 is attached to the end surface of the optical fiber 5 (refer to FIG. 3A). Further, a thickness of the cross-linkable refractive index matching member 6 was formed to 20 to 25 µm.

As shown in FIG. 4, the optical fiber 5 to which the cross-linkable refractive index matching member 6 was attached, was cut and then the optical fiber 5 was inserted and fixed to an optical connector 18 comprising a ferrule 7, an optical fiber connector 9 (comprising plates 8, a clamp 10 functioning as a spring for covering the plate 8 and strengthening a connection of each other of the plates 8, a groove 16 formed on the plate 8 for a second optical fiber 12 to be inserted, and a wedge insertion groove 17 for a wedge 15 to be inserted), and a housing 13. Further, the optical fiber 5 was cut at a front end of the ferrule 7, and the front end of the ferrule 7 was polished, so that the first optical fiber 11 was incorporated into the ferrule 7. Ten pieces of the optical connectors 18 made as described above were prepared.

By using the means as described above, a holey fiber (the second optical fiber 12) was connected as well as Example 1, and the tests (1) to (4) were conducted in order. Results of the tests (1) to (4) are shown in Table 1. Further, FIG. 8 is a cross-sectional view showing an example of a second optical fiber inserted to an optical connector in a preferred embodiment according to the invention.

Comparative Example 1

As a cross-linkable refractive index matching agent, OC-431A-LVP (with refractive index of 1.45) manufactured by Nye Lubricants Inc. was prepared. And the cross-linkable refractive index matching agent was used as follows.

A covering layer of an optical fiber core 4 manufactured by Hitachi Cable Ltd. and marketed under a trade name of "BBG-SM-WF" (outer diameter of 250 µm and fiber diameter of 125±1 µm) was removed by 200 mm length, after a surface of the optical fiber 5 composed of a glass material and being exposed by removal of the covering layer was cleansed by an alcohol cleaning, an end portion of the optical fiber 5 was cut by a fiber cutter at a right angle (angular error: 1 degree or less).

And the optical fiber 5 was cut and then the optical fiber 5 was inserted and fixed to an optical connector equal to the optical connector 18 shown in FIG. 4. Further, the optical fiber 5 was cut at a front end of the ferrule 7, and the front end of the ferrule 7 was polished, so that a connection portion of the optical fiber in the optical connector was filled with the cross-linkable refractive index matching agent. Optical connectors 22 (not shown) made as described above were prepared.

By using the means as described above, a holey fiber (the second optical fiber 12) was connected as well as Examples 1, 2 and the tests (1) to (4) were conducted in order. Results of the tests (1) to (4) are shown in Table 1.

Results of the Tests

Table 1 shows results of the tests in Examples 1, 2 and Comparative Example 1. As is clear from the Table 1, in Comparative Example 1 the increase of loss was increased by 1 dB or more only by being left at a room temperature (23±2° C.) during 24 hours, but on the other hand in Examples 1, 2 using the cross-linkable refractive index matching member 6, in a case of being left at a room temperature (23±2° C.) during 24 hours, the increase of loss was kept smaller than 0.1 dB even in the various kinds of temperature and humidity tests, and a good optical transmission characteristic was maintained.

Further, after the tests, the optical connectors used in Examples 1, 2 and Comparative Example 1 were broke down and hole portions of the holey fiber (the second optical fiber 12) were observed. According to the observation, it was found that the cross-linkable refractive index matching agent had entered into the hole portions of the holey fiber (the second optical fiber 12) used in Comparative Example 1 by a depth of several millimeters to ten-odd millimeters, but on the other hand it was only found that the cross-linkable refractive index matching member 6 had entered into the hole portions of the holey fiber (the second optical fiber 12) used in Examples 1, 2 by an extent of only a thickness attached to the fiber 12 at a maximum.

TABLE 1

|  |  | Example 1 | Example 2 | Comparative Example 1 |
|---|---|---|---|---|
| Room temperature (23 ± 2° C.) (just after) | Connection loss (dB) | 0.1 to 0.4 | 0.2 to 0.5 | 0.1 to 0.4 |
|  | Return loss (dB) | −60 to −45 | −55 to −45 | −55 to −45 |
| Room temperature (23 ± 2° C.) (after 24 hours) | Increasing amount of loss (dB) | 0.00 to 0.02 | 0.00 to 0.03 | 1 or more |
| Continuous temperature and humidity cycle test Increasing amount of loss (dB) |  | less than 0.3 | less than 0.3 | 1 or more |
| Temperature cycle test Increasing amount of loss (dB) |  | less than 0.3 | less than 0.3 | 1 or more |
| Temperature and humidity cycle test Increasing amount of loss (dB) |  | less than 0.3 | less than 0.3 | 1 or more |
| Low temperature test Increasing amount of loss (dB) |  | less than 0.3 | less than 0.3 | 1 or more |

Measurement wavelength λ = 1550 nm, Light source: Light Emitting Diode (LED)

Figure 13:
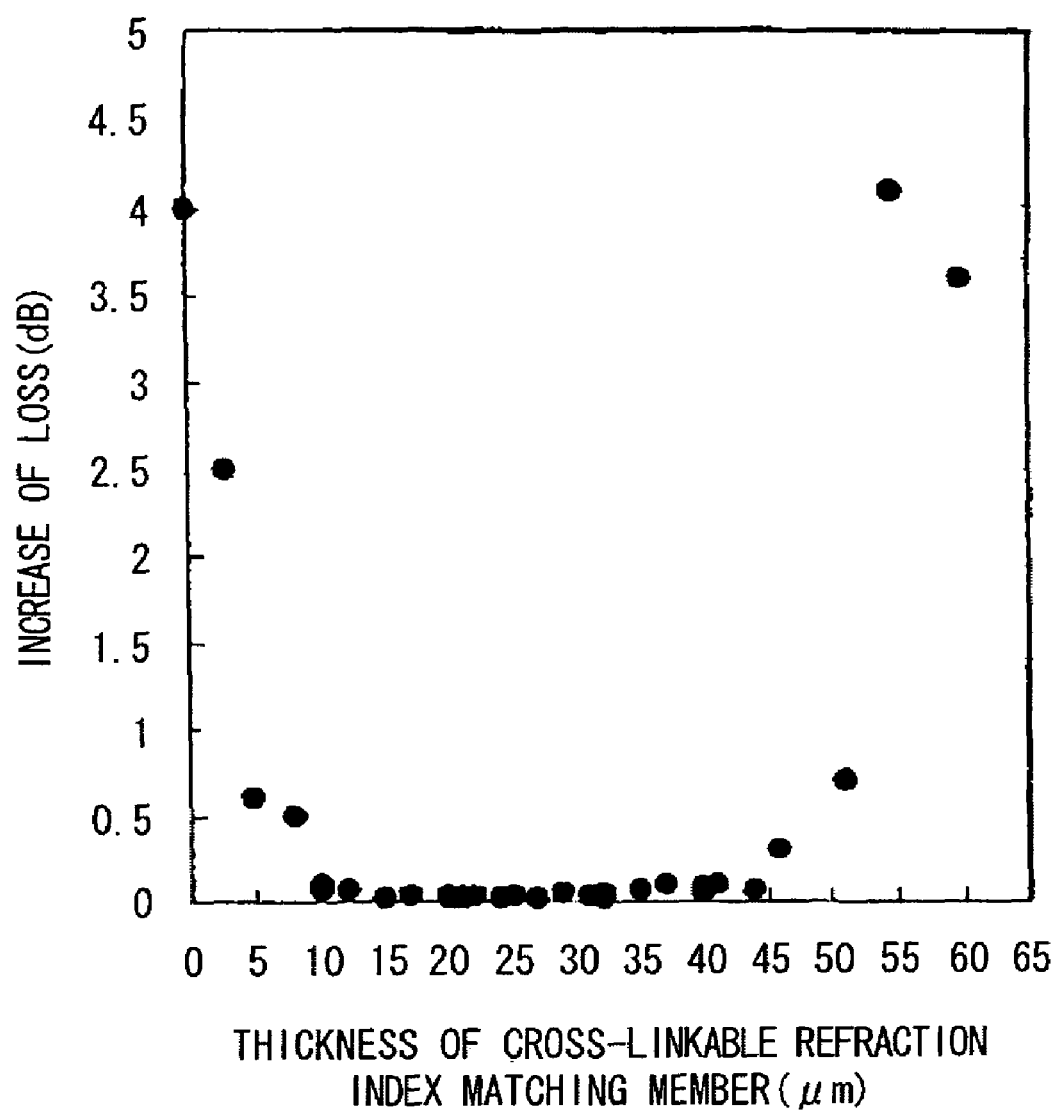
FIG. 13 is a graph showing a relation between a thickness (μm) of the cross-linkable refractive index matching member and an increase of loss (dB) measured in the temperature cycle test while a thickness of the cross-linkable refractive index matching member is changed, the member attached to the end surface in back-end side of the first optical fiber in the first preferred embodiment (Examples 1, 2) according to the invention.

FIG. 13 is a graph showing a relation between a thickness (μm) of the cross-linkable refractive index matching member 6 and an increase of loss (dB) measured in the temperature cycle test (−40 to 70° C./6 hours×10 cycles) described above as test No. (2) while a thickness of the cross-linkable refractive index matching member 6 is changed, the member being attached to the end face 11a of the first optical fiber 11 in the first preferred embodiment (Examples 1, 2) according to the invention. From a result shown in FIG. 13 it is recognized that if the thickness of cross-linkable refractive index matching member 6 becomes thinner than 10 μm and then the increase of loss starts to be increased, and that if the thickness of cross-linkable refractive index matching member 6 becomes 5 μm or less and then the increase of loss is drastically increased. And, it is recognized that if the thickness of cross-linkable refractive index matching member 6 becomes thicker than 35 μm and then the increase of loss starts to be increased, and that if the thickness of cross-linkable refractive index matching member 6 becomes thicker than 50 μm and then the increase of loss is drastically increased. Further, in the temperature cycle test the end face 11a of the first optical fiber 11 of which the curvature radius was formed to 5 mm was used.

In the optical connector 18 according to the invention, as the second optical fiber 12, not only the holey fiber but also an usual optical fiber not comprising a plurality of hole portions at cyclical intervals therein can be used.

Example 3

As a cross-linkable refractive index matching agent, an ethyl acetate 50% solution of an acrylic resin 100 weight parts comprising n-butyl acrylate/methyl acrylate/acrylic acid/2-hydroxyethylmethacrylate copolymer (compounding ratio=82/15/2.7/0.3 (weight part)) and a cross-linking agent 1.0 weight part manufactured by Nihon Polyurethane Industry Co., Ltd and marketed under a trade name of "coronate L" were compounded and mixed together.

An optical transmission in a wavelength range of 1300 to 1600 nm of an cross-linkable refractive index matching member obtained by cross-linking and hardening the acrylic adhesive coating solution (the cross-linkable refractive index matching agent) obtained as described above, was measured by a spectral photometer. As a result of the measurement, the optical transmission of 93 to 95% was obtained. And a refractive index thereof is also measured by an Abbe refraction meter, so that a refractive index of 1.465±0.005 or less at a room temperature (23±2° C.) was obtained.

Further, a breaking elongation thereof is also measured, so that the breaking elongation of 200 to 300% was obtained, and a glass adhesive force thereof is also measured, so that the glass adhesive force of 500 to 1000 g/10 mm width was obtained.

The cross-linkable refractive index matching member obtained as described above was used as described below.

Figure 3B:
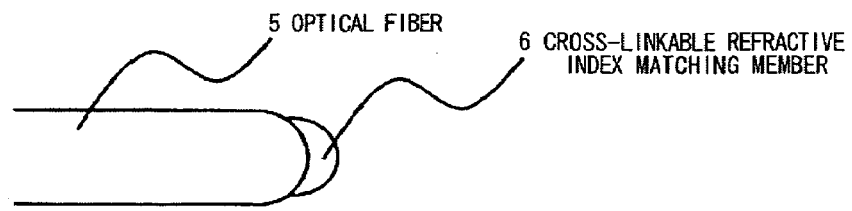
FIG. 3B is a side view showing an example of an optical fiber being attached with a cross-linkable refractive index matching member at the end face thereof, to be housed in an optical connector in a preferred embodiment (Examples 3 and 4) according to the invention (a partially enlarged view showing an end portion of the optical fiber shown in FIG. 2)

As shown in FIG. 2, first a covering layer of an optical fiber core 4 manufactured by Hitachi Cable Ltd. and marketed under a trade name of "BBG-SM-WF" (outer diameter of 250 μm and fiber diameter of 125±1 μm) was removed by 200 mm length, after a surface of the optical fiber 5 composed of a glass material and being exposed by removal of the covering layer was cleansed by an alcohol cleaning, an end portion of the optical fiber 5 was cut by a fiber cutter at a right angle (angular error: 1 degree or less), after a curvature radius of the end face of optical fiber was formed to 1 mm by an electro-discharge machining, the cross-linkable refractive index matching agent obtained as described above was attached to the end surface of the optical fiber 5 by a potting and was cross-linked and hardened by a room temperature incubation, so that the cross-linkable refractive index matching member 6 is attached to the end surface of the optical fiber 5 (See FIG. 3B). Further, a thickness of the cross-linkable refractive index matching member 6 was formed to 20 to 25 μm.

As shown in FIG. 4, the optical fiber 5 to which the cross-linkable refractive index matching member 6 was attached, was cut and then the optical fiber 5 was inserted and fixed to an optical connector 18 comprising a ferrule 7, an optical fiber connector 9 (comprising plates 8, a clamp 10 functioning as a spring for covering the plate 8 and strengthening a connection of each other of the plates 8, a groove 16 formed on the plate 8 for a second optical fiber 12 to be inserted, and a wedge insertion groove 17 for a wedge 15 to be inserted), and a housing 13. Further, the optical fiber 5 was cut at a front end of the ferrule 7, and the front end of the ferrule 7 was polished, so that the first optical fiber 11 was incorporated into the ferrule 7. Ten pieces of the optical connectors 18 made as described above were prepared.

Next, a covering layer in one end of a holey fiber manufactured by Hitachi Cable Ltd. and marketed under a trade name of "BBG-HF" (outer diameter of 250 μm and fiber diameter of 125±1 μm) to be used as a second optical fiber 12 at a setting of the optical fiber was removed, and a surface of the second optical fiber 12 composed of a glass material and being exposed by removal of the covering layer was cleansed by an alcohol cleaning, and then an end portion of the second optical fiber 12 was cut by a fiber cutter at a right angle (angular error: 1 degree or less), and the second optical fiber 12 was inserted to a optical connector 18 preliminarily prepared so as to realize a connection by the optical fiber connector 9. Further, FIG. 8 is a cross sectional view showing an example of second optical fiber 12 to be inserted to an optical connector in a preferred embodiment according to the invention.

The following measurements were conducted. That is, a connection loss (dB) and a return loss (dB) just after the second optical fiber 12 was connected, and a connection loss (dB) and an increase of loss by such tests at a connection portion after a room temperature (23±2° C.) incubation during 24 hours as (1) a continuous temperature and humidity cycle test (temperature 85° C.×336 →hours temperature 60° C.×humidity 95%×336 hours →temperature −40 to 75° C./8 hours×42 cycles), (2) a temperature cycle test (temperature −40 to 70° C./6 hours×10 cycles), (3) a temperature and humidity cycle test ((temperature 25° C.×humidity 93%~temperature 65° C.×humidity 93%~temperature 25° C.×humidity 93%~temperature 65° C. ×humidity 93%~temperature 25° C.×humidity 93%~temperature −10 to 25° C.×humidity 93%~temperature 65° C.×humidity 93%~temperature 25° C.×humidity 93%~temperature 65° C.×humidity 93% ~temperature 25° C.×humidity 93%)×5 cycles), (4) a low temperature test (temperature −40×240 hours) were measured (temperature conditions in each of the tests were shown in FIGS. 9 to 12). In the test (1), five pieces of the optical connectors 18 of ten pieces thereof preliminarily prepared were used. And the tests (2) to (4) were conducted in order by using remaining five pieces of the optical connectors 18. Results of the tests (1) to (4) are shown in Table 2.

Further, FIGS. 5 to 7 shows a process of inserting the first optical fiber 11 to the optical connector 18 and connecting by the optical fiber connector 9. First, wedges 15 formed in a jig 14 (refer to FIG. 5) are inserted to the wedge insertion grooves 17 formed in the plate 8 constituting the optical fiber connector 9. And the second optical fiber 12 is inserted to an enlarged groove 16a enlarged by the above (refer to FIG. 6B and FIG. 7), so that the first optical fiber 11 and the second optical fiber 12 are connected to each other. Further, the groove 16 is not limited to a specific shape, but in a case of a V-shaped groove (a groove comprising a cross-sectional shape of a V-shape) the most preferable characteristic can be obtained. That is, when an end surface of the second optical fiber 12 and an end face 11a of the first optical fiber 11 are connected by a butting connection, the cross-linkable refractive index matching member 6 not directly contributing to the butting connection escapes to a space in the V-shaped groove, so that a good connection characteristic can be obtained.

Example 4

As a cross-linkable refractive index matching agent, an addition type silicone based adhesive material coating liquid comprising SD4590/BY24-741/SRX212/toluene (compounding ratio=100/1.0/0.9/50 (weight part)) is prepared (all of SD4590, BY24-741 and SRX212 are manufactured by Dow Corning Toray Co., LTd).

An optical transmission in a wavelength range of 1300 to 1600 nm of an cross-linkable refractive index matching member obtained by cross-linking and hardening the addition type silicone based adhesive material coating liquid (the cross-linkable refractive index matching agent) obtained as described above, was measured by a spectral photometer. As a result of the measurement, the optical transmission of 92 to 94% was obtained. And a refractive index thereof is also measured by an Abbe refraction meter, so that a refractive index of 1.465±0.005 or less at room temperature (23±2° C.) was obtained.

Further, a breaking elongation thereof is also measured, so that the breaking elongation of 200 to 300% was obtained, and a glass adhesive force thereof is also measured, so that the glass adhesive force of 500 to 1000 g/10 mm width was obtained.

The cross-linkable refractive index matching member obtained as described above was used as described below.

As shown in FIG. 2, first a covering layer of an optical fiber core 4 manufactured by Hitachi Cable Ltd. and marketed under a trade name of "BBG-SM-WF" (outer diameter of 250 μm and fiber diameter of 125±1 μm) was removed by 200 mm length, after a surface of the optical fiber 5 composed of a glass material and being exposed by removal of the covering layer was cleansed by an alcohol cleaning, an end portion of the optical fiber 5 was cut by a fiber cutter at a right angle (angular error: 1 degree or less), after a curvature radius of the end face of optical fiber was formed to 15 mm by an electro-discharge machining, the cross-linkable refractive index matching agent obtained as described above was attached to the end surface of the optical fiber 5 by a potting and was cross-linked and hardened by a room temperature incubation, so that the cross-linkable refractive index matching member 6 is attached to the end surface of the optical fiber 5 (refer to FIG. 3B). Further, a thickness of the cross-linkable refractive index matching member 6 was formed to 20 to 25 μm.

As shown in FIG. 4, the optical fiber 5 to which the cross-linkable refractive index matching member 6 was attached, was cut and then the optical fiber 5 was inserted and fixed to an optical connector 18 comprising a ferrule 7, an optical fiber connector 9 (comprising plates 8, a clamp 10 functioning as a spring for covering the plate 8 and strengthening a connection of each other of the plates 8, a groove 16 formed on the plate 8 for a second optical fiber 12 to be inserted, and a wedge insertion groove 17 for a wedge 15 to be inserted), and a housing 13. Further, the optical fiber 5 was cut at a front end of the ferrule 7, and the front end of the ferrule 7 was polished, so that the first optical fiber 11 was incorporated into the ferrule 7. Ten pieces of the optical connectors 18 made as described above were prepared.

By using the means as described above, a holey fiber (the second optical fiber 12) was connected as well as Example 3, and the tests (1) to (4) were conducted in order. Results of the tests (1) to (4) are shown in Table 2. Further, FIG. 8 is a cross-sectional view showing an example of a second optical fiber inserted to an optical connector in a preferred embodiment according to the invention.

Comparative Example 2

As a cross-linkable refractive index matching agent, OC-431A-LVP (with a refractive index 1.45) manufactured by Nye Lubricants Inc. was prepared. The cross-linkable refractive index matching agent was used as follows.

A covering layer of an optical fiber core 4 manufactured by Hitachi Cable Ltd. and marketed under a trade name of "BBG-SM-WF" (outer diameter of 250 μm and fiber diameter of 125±1 μm) was removed by 200 mm length, after a surface of the optical fiber 5 composed of a glass material and being exposed by removal of the covering layer was cleansed by an alcohol cleaning, an end portion of the optical fiber 5 was cut by a fiber cutter at a right angle (angular error: 1 degree or less), and a curvature radius of the end face of optical fiber was formed to 1 mm by an electro-discharge machining.

And the optical fiber 5 was cut and then the optical fiber 5 was inserted and fixed to an optical connector equal to the optical connector 18 shown in FIG. 4. Further, the optical fiber 5 was cut at a front end of the ferrule 7, and the front end of the ferrule 7 was polished, so that a connection portion of the optical fiber in the optical connector was filled with the cross-linkable refractive index matching agent. Optical connectors 22 (not shown) made as described above were prepared.

By using the means as described above, a holey fiber (the second optical fiber 12) was connected as well as Examples 3, 4 and the tests (1) to (4) were conducted in order. Results of the tests (1) to (4) are shown in Table 2.

Results of the Tests

Table 2 shows results of the tests in Examples 3, 4 and Comparative Examples 2, 3. As is clear from the Table 2, in Comparative Example 2 the increase of loss was increased by 1 dB or more only by being left at a room temperature (23±2° C.) during 24 hours, but on the other hand in Examples 3, 4 using the cross-linkable refractive index matching member 6, in a case of being left at a room temperature (23±2° C.) during 24 hours, the increase of loss was kept smaller than 0.1 dB even in the various kinds of temperature and humidity tests, and a good optical transmission characteristic was maintained.

Further, in Example 3 the increase of loss in the various kinds of temperature and humidity tests was kept smaller in comparison with Example 1 without forming the end face 11a of the first optical fiber 11 to a spherical shape as conducted in Example 3, and being attached with the cross-linkable refractive index matching member 6. Therefore, it is recognized that a further stable optical transmission characteristic is obtained in the connection of the holey fiber (the second optical fiber 12) by means that the end face 11a of the first optical fiber 11 is formed to a spherical shape as conducted in Example 3 and the cross-linkable refractive index matching member 6 is attached.

Further, after the tests, the optical connectors used in Examples 3, 4 and Comparative Example 2 were broke down and hole portions of the holey fiber (the second optical fiber 12) were observed. According to the observation, it was found that the cross-linkable refractive index matching agent had entered into the hole portions of the holey fiber (the second optical fiber 12) used in Comparative Example 2 by a depth of several millimeters to ten-odd millimeters, but on the other hand it was only found that the cross-linkable refractive index matching member 6 had entered into the hole portions of the holey fiber (the second optical fiber 12) used in Examples 3, 4 by an extent of only a thickness attached to the fiber 12 at a maximum.

TABLE 2

| | | Example | | Comparative Example |
|---|---|---|---|---|
| | | 3 | 4 | 2 |
| Room temperature (23 ± 2° C.) (just after) | Connection loss (dB) | 0.5 to 0.2 | 0.00 to 0.02 | 0.1 to 0.4 |
| | Return loss (dB) | −60 to −50 | −55 to −45 | −55 to −45 |
| Room temperature (23 ± 2° C.) (after 24 hours) | Increasing amount of loss (dB) | 0.00 to 0.02 | 0.00 to 0.02 | 1 or more |
| Continuous temperature and humidity cycle test Increasing amount of loss (dB) | | 0.00 to 0.05 | 0.00 to 0.05 | 1 or more |
| Temperature cycle test Increasing amount of loss (dB) | | 0.00 to 0.02 | 0.00 to 0.02 | 1 or more |
| Temperature and humidity cycle test Increasing amount of loss (dB) | | 0.00 to 0.02 | 0.00 to 0.02 | 1 or more |
| Low temperature test Increasing amount of loss (dB) | | 0.00 to 0.02 | 0.00 to 0.02 | 1 or more |

Measurement wavelength λ = 1550 nm, Light source: Light Emitting Diode (LED)

Figure 14:
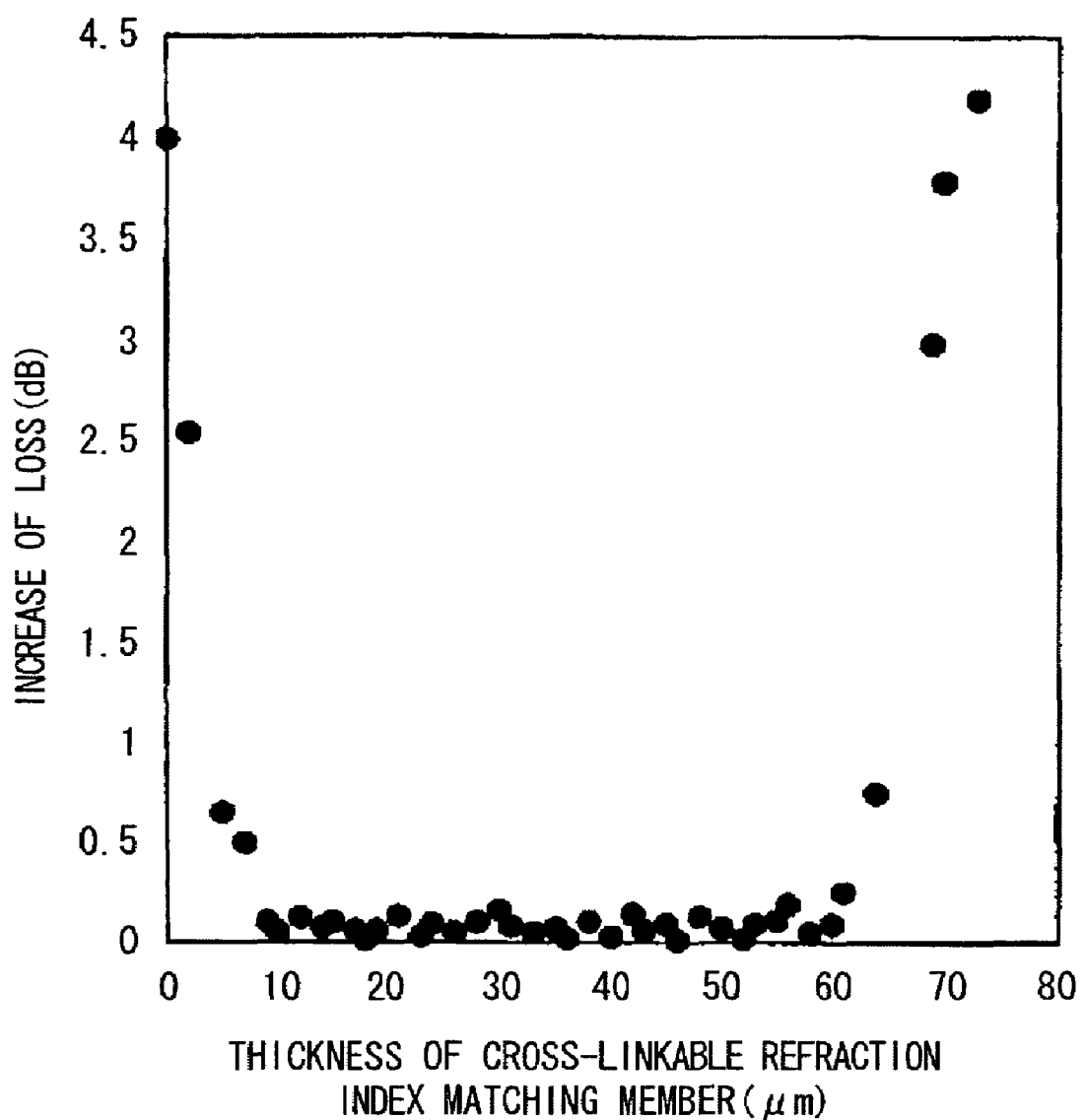
FIG. 14 is a graph showing a relation between a thickness (μm) of the cross-linkable refractive index matching member and an increase of loss (dB) measured in the temperature cycle test while a thickness of the cross-linkable refractive index matching member is changed, the member attached to the end surface in back-end side of the first optical fiber in the first preferred embodiment (Examples 3, 4) according to the invention.

FIG. 14 is a graph showing a relation between a thickness (μm) of the cross-linkable refractive index matching member 6 and an increase of loss (dB) measured in the temperature cycle test (−40 to 70° C./6 hours×10 cycles) described above as test No. (2) while a thickness of the cross-linkable refractive index matching member 6 is changed, the member being attached to the end face 11a of the first optical fiber 11 in the first preferred embodiment (Examples 3, 4) according to the invention. From a result shown in FIG. 14 it is recognized that if the thickness of cross-linkable refractive index matching member 6 becomes thinner than 10 μm and then the increase of loss starts to be increased, and that if the thickness of cross-linkable refractive index matching member 6 becomes 5 μm or less and then the increase of loss is drastically increased. And, it is recognized that if the thickness of cross-linkable refractive index matching member 6 becomes thicker than 35 μm and then the increase of loss starts to be increased, and that if the thickness of cross-linkable refractive index matching member 6 becomes thicker than 60 μm and then the increase of loss is drastically increased. Further, in the temperature cycle test the end face 11a of the first optical fiber 11 of which the curvature radius was formed to 5 mm was used.

In the optical connector 18 according to the invention, as the second optical fiber 12, not only the holey fiber but also an usual optical fiber not comprising a plurality of hole portions at cyclical intervals therein can be used.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical connector, comprising:
    a ferrule into which a first optical fiber is inserted;
    an optical fiber connector disposed at a back end of the ferrule; and
    a cross-linkable refractive index matching member attached onto an end face on a back end side of the first optical fiber, the cross-linkable refractive index matching member comprising a rate of change in refractive index within ±2% at a temperature of −40 to 70° C.,
    wherein the end face on the back end side of the first optical fiber and an end face of a second optical fiber to be inserted into the optical fiber connector from a back end side thereof are to be connected by a butting connection, and
    the cross-linkable refractive index matching member is formed such that a cross-linkable refractive index matching agent is coated on the end face on the back end side of the first optical fiber, and the coated agent is cross-linked and hardened.

2. The optical connector according to claim 1, wherein:
    the end face on the back end side of the first optical fiber has a spherical form.

3. The optical connector according to claim 1, wherein:
    the cross-linkable refractive index matching member comprises a refractive index within 1.46±0.05.

4. The optical connector according to claim 1, wherein:
    the cross-linkable refractive index matching member comprises an optical transmittance of 80% or more.

5. The optical connector according to claim 1, wherein:
    the cross-linkable refractive index matching member comprises a breaking elongation of 50% or more.

6. The optical connector according to claim 1, wherein:
the cross-linkable refractive index matching member comprises a glass adhesive force of 50 g/10 mm width or more.

7. The optical connector according to claim 1, wherein:
the cross-linkable refractive index matching member comprises a thickness of 5 to 100 μm.

8. The optical connector according to claim 1, wherein:
a face of the cross-linkable refractive index matching member to contact the end face of the second optical fiber to be inserted into the optical fiber connector from the back end side thereof has a spherical form.

9. The optical connector according to claim 1, wherein:
the cross-linkable refractive index matching member is attached to only the end face of the first optical fiber.

10. The optical connector according to claim 1, wherein:
the cross-linkable refractive index matching member is attached between and including the end face to a side face of the first optical fiber.

11. The optical connector according to claim 2, wherein:
the spherical form of the end face on the back end side of the first optical fiber comprises a curvature radius of 0.1 to 30 mm.

12. The optical connector according to claim 1, wherein:
the optical fiber connector comprises a plate comprising a groove, and the groove has a cross-sectional area greater than that of the second optical fiber to be inserted from the back end side thereof.

13. The optical connector according to claim 12, wherein:
the groove comprises a V-shaped groove.

14. The optical connector according to claim 1, wherein:
the second optical fiber comprises a holey fiber.

15. A connection structure of optical fibers comprising:
a first optical fiber;
a ferrule into which the first optical fiber is inserted;
an optical fiber connector disposed at a back end of the ferrule;
a second optical fiber inserted into the optical fiber connector from a back end side thereof; and
a cross-linkable refractive index matching member attached onto an end face on a back end side of the first optical fiber, the cross-linkable refractive index matching member comprising a rate of change in refractive index within ±2% at a temperature of −40 to 70° C.;
wherein the end face on the back end side of the first optical fiber and an end face of a second optical fiber are connected by a butting connection, and
the cross-linkable refractive index matching member is formed such that a cross-linkable refractive index matching agent is coated on the end face on the back end side of the first optical fiber, and the coated agent is cross-linked and hardened.

16. The connection structure according to claim 15, wherein:
the end face on the back end side of the first optical fiber has a spherical form.

17. The connection structure according to claim 15, wherein:
the cross-linkable refractive index matching member comprises a refractive index within 1.46±0.05.

18. The connection structure according to claim 15, wherein:
the cross-linkable refractive index matching member comprises an optical transmittance of 80% or more.

19. The connection structure according to claim 15, wherein:
the cross-linkable refractive index matching member comprises a breaking elongation of 50% or more.

20. The connection structure according to claim 15, wherein:
the cross-linkable refractive index matching member comprises a glass adhesive force of 50 g/10 mm width or more.

21. The connection structure according to claim 15, wherein:
the cross-linkable refractive index matching member comprises a thickness of 5 to 100 μm.

22. The connection structure according to claim 15, wherein:
a face of the cross-linkable refractive index matching member in contact with the end face of the second optical fiber by being inserted into the optical fiber connector from the back end side thereof has a spherical form spherical.

23. The connection structure according to claim 15, wherein:
the cross-linkable refractive index matching member is attached onto only the end face of the first optical fiber.

24. The connection structure according to claim 15, wherein:
the cross-linkable refractive index matching member is attached between and including the end face to a side face of the first optical fiber.

25. The connection structure according to claim 16, wherein:
the spherical form of the end face on the back end side of the first optical fiber comprises a curvature radius of 0.1 to 30 mm.

26. The connection structure according to claim 15, wherein:
the optical fiber connector comprises a plate comprising a groove, and the groove has a cross-sectional area greater than that of the second optical fiber inserted from the back end side thereof.

27. The connection structure according to claim 26, wherein:
the groove comprises a V-shaped groove.

28. The connection structure according to claim 15, wherein:
the second optical fiber comprises a holey fiber.

* * * * *